US009262094B2

(12) United States Patent
Kisley et al.

(10) Patent No.: US 9,262,094 B2
(45) Date of Patent: Feb. 16, 2016

(54) DISTRIBUTED FILE SERVING ARCHITECTURE WITH METADATA STORAGE AND DATA ACCESS AT THE DATA SERVER CONNECTION SPEED

(75) Inventors: Richard Victor Kisley, Tucson, AZ (US); Philip Douglas Knight, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 12/560,333

(22) Filed: Sep. 15, 2009

(65) Prior Publication Data

US 2010/0095059 A1 Apr. 15, 2010

Related U.S. Application Data

(62) Division of application No. 10/431,413, filed on May 7, 2003, now Pat. No. 7,610,348.

(51) Int. Cl.
*G06F 15/16* (2006.01)
*G06F 3/06* (2006.01)
*H04L 29/06* (2006.01)

(52) U.S. Cl.
CPC .............. *G06F 3/0659* (2013.01); *G06F 3/061* (2013.01); *G06F 3/064* (2013.01); *G06F 3/067* (2013.01); *G06F 3/0667* (2013.01); *H04L 63/08* (2013.01)

(58) Field of Classification Search
USPC ......... 709/201, 203, 212, 217, 219, 227, 228, 709/229, 230, 238, 245, 250; 707/100, 200, 707/205; 711/100
See application file for complete search history.

(56) References Cited

U.S. PATENT DOCUMENTS

| | | | |
|---|---|---|---|
| 6,081,883 A | 6/2000 | Popelka et al. |
| 6,339,787 B1 | 1/2002 | Yohe et al. |
| 6,351,776 B1 | 2/2002 | O'Brien et al. |
| 6,453,354 B1 | 9/2002 | Jiang et al. |
| 6,502,174 B1 | 12/2002 | Beardsley et al. |
| 6,697,878 B1 | 2/2004 | Imai |

(Continued)

FOREIGN PATENT DOCUMENTS

| | | |
|---|---|---|
| JP | 200020490 | 1/2000 |
| WO | 0180012 | 10/2001 |
| WO | 02061575 | 8/2002 |

OTHER PUBLICATIONS

Coleman et al., The Emerging Storage Management Paradigm, Twelfth IEEE Symposium on Mass Storage Systems, Apr. 26, 1993, pp. 101-110.

(Continued)

*Primary Examiner* — Scott B Christensen
(74) *Attorney, Agent, or Firm* — William K. Konrad; Konrad, Raynes, Davda and Victor LLP

(57) ABSTRACT

Method, apparatus and program storage device that provides a distributed file serving architecture with metadata storage virtualization and data access at the data server connection speed is provided. A host issues a file access request including data target locations. The file access request including data target locations is processed. Remote direct memory access (RDMA) channel endpoint connection are issued in response to the processing of the file access request. An RDMA transfer of the file-block data associated with the file access request is made directly between a memory at the host and a data server.

21 Claims, 7 Drawing Sheets

(56) References Cited

U.S. PATENT DOCUMENTS

| | | | |
|---|---|---|---|
| 6,792,507 | B2 | 9/2004 | Chiou et al. |
| 6,931,450 | B2 * | 8/2005 | Howard et al. ............... 709/229 |
| 2001/0011247 | A1 | 8/2001 | O'Flaherty et al. |
| 2001/0047400 | A1 | 11/2001 | Coates et al. |
| 2002/0004816 | A1 | 1/2002 | Vange et al. |
| 2002/0007420 | A1 | 1/2002 | Eydelman et al. |
| 2002/0010762 | A1 | 1/2002 | Kodama |
| 2002/0029305 | A1 | 3/2002 | Satran et al. |
| 2002/0083120 | A1 | 6/2002 | Soltis |
| 2002/0099797 | A1 | 7/2002 | Merrell et al. |
| 2002/0103943 | A1 | 8/2002 | Lo et al. |
| 2002/0103954 | A1 | 8/2002 | Karamanolis et al. |
| 2002/0112023 | A1 | 8/2002 | Karamanolis et al. |
| 2002/0128995 | A1 | 9/2002 | Muntz et al. |
| 2002/0129182 | A1 | 9/2002 | Coffey |
| 2002/0133561 | A1 | 9/2002 | O'Brien et al. |
| 2003/0145230 | A1 * | 7/2003 | Chiu et al. .................... 713/201 |
| 2004/0233910 | A1 | 11/2004 | Chen et al. |

OTHER PUBLICATIONS

Collins et al., Los Alamos HPDS: High Speed Data Transfer, Twelfth IEEE Symposium on Mass Storage Systems, Apr. 26, 1993, pp. 111-118.

Non-U.S. Search Report from Taiwan regarding Information Disclosure Statement dated Mar. 5, 2009, 2 pgs.

IBM International Technical Support Org., "Storage Networking Virtualization", IBM, Dec. 2000, Chapter 6, pp. 71-79.

"Infiniband Architecture: Next-Generation Server I/O," Internet, Oct. 2000, 10 pages.

Hellwagner et al., "VI Architecture Communication Features and Performance on the Giganet Cluster LAN", Future Generation Computer systems, Elsevier Science Publishers, Amsterdam, NL, vol. 18, No. 3, Jan. 2002, pp. 421-433.

Magoutis, K., Design and Implementation of a Direct Access File System (DAFS) Kernel Server for FreeBSD, Dec. 3, 2001, 24 pgs.

Menon et al., "IBM Storage Tank-a-Heterogenerous Scalable SAN File System", IBM Systems Journal, vol. 42, No. 2, 2003.

Machine Translation for JP20000020490, published on Jan. 21, 2001, 58 pgs.

Response to Office Action 1 for U.S. Appl. No. 10/431,413, dated Sep. 19, 2007, 16 pp.

Response to Office Action 2 for U.S. Appl. No. 10/431,413, dated May 12, 2008, 7 pp.

Response to Office Action 3 for U.S. Appl. No. 10/431,413, dated Jul. 7, 2008, 7 pp.

Response to Office Action 4 for U.S. Appl. No. 10/431,413, dated Feb. 2, 2009, 11 pp.

First Office Action for U.S. Appl. No. 10/431,413, dated May 30, 2007, 34 pp.

Final Office Action 1 for U.S. Appl. No. 10/431,413, dated Mar. 7, 2008, 12 pp.

Second Office Action for U.S. Appl. No. 10/431,413, dated Oct. 3, 2008, 11 pp.

Notice of Allowance for U.S. Appl. No. 10/431,413, dated Jun. 12, 2009, 9 pp.

* cited by examiner

DISTRIBUTED FILE SERVING ARCHITECTURE WITH METADATA STORAGE AND DATA ACCESS AT THE DATA SERVER CONNECTION SPEED

RELATED APPLICATIONS

This application is a divisional application of copending application Ser. No. 10/431,413, filed May 7, 2003, assigned to the assignee of the present application and entitled "A distributed file serving architecture system with metadata storage virtualization and data access at the data server connection speed." This application is incorporated by reference in its entirety.

BACKGROUND OF THE INVENTION

1. Field of the Invention

This invention relates in general to storage system architectures, and more particularly to a method, apparatus and program storage device that provides a distributed file serving architecture with metadata storage virtualization and data access at the data server connection speed.

2. Description of Related Art

The ever increasing capability of computers in storing and managing information has made them increasingly indispensable to modern businesses. The popularity of these machines has lead in turn to the widespread sharing and communication of data such as electronic mail and documents over one or more computer networks, including local area networks, wide area networks such as the Internet and wireless networks.

The computer operating system is a large, complex piece of software which manages hardware and software resources of the computer processing system. On the other hand, storage management software is used in the organization of storage devices, such as disks, into logical groupings to achieve various performance and availability characteristics. For example, the storage devices may be arranged to create individual volumes or concatenations of volumes, mirror sets or stripes of mirror sets, or even redundant arrays of independent disks (RAID). The computer system platform on which the operating system executes to provide such management functions typically includes a host computer coupled to a storage adapter or controller, which in turn manages storage volumes. The operating system functionally organizes this platform by, inter alia, invoking input/output (I/O) operations in support of software processes or applications executing on the computer.

A storage architecture decomposes management of the storage devices into individual components and defines their functional operations with respect to the flow of information and control among them. The individual components include an I/O subsystem and a file system, each of which is generally independent of one another and interact according to interfaces defined by the architecture. The I/O subsystem provides an efficient mode of communication between the computer and the storage devices that allows programs and data to be entered into the memory of the computer for processing. The subsystem also enables the results obtained from computations of that information to be recorded on the storage devices.

The file system contains general knowledge of the organization of information on the storage devices and provides algorithms that implement properties/performance of the desired storage architecture. To that end, the file system is a high-level software entity comprising a collection of program modules, e.g., software drivers that incorporate a command set for the storage devices.

A storage network may include one or more server computers, which are a source and repository for large blocks of data, and multiple client computers, which communicate with the servers, operate on smaller blocks of data, and transfer the edited data back to the servers. The server computers typically are capable of storing large amounts of data. Such storage can be achieved with a variety of data storage systems, including large magnetic and magneto-optical disk libraries and magnetic tape libraries.

A server may implement a file system, as discussed above, for managing the space of storage media. The file system provides a logical framework to the users of a computer system for accessing data stored in the storage media. The logical framework usually includes a hierarchy of directory structures to locate a collection of files that contain user-named programs or data. The use of directories and files removes the concern from the users of finding the actual physical locations of the stored information in a storage medium.

The logical framework may be stored as "metadata" or control information for the file such as file size and type and pointers to the actual data. The contents of a file may be called file data to distinguish it from metadata. Metadata is "data about data". Metadata is the file system overhead that is used to keep track of everything about all of the files on a volume. For example, metadata tells what allocation units make up the file data for a given file, what allocation units are free, what allocation units contain bad sectors, and so on.

I/O processing is typically performed under the auspices of the file system in that applications typically interact with the file system to manipulate (i.e., read or write) the files. I/O subsystems, on the other hand, interact with storage devices at lower software levels by manipulating blocks of data.

The file system and I/O subsystem are composed of many layers of software driver code that is commonly referred to as an I/O stack. A conventional I/O stack may include a file system driver, a logical volume driver, a disk class driver and device-specific drivers, such as small computer system interface (SCSI) port and miniport drivers.

The organization of a file system and I/O subsystem within a hardware platform vary among conventional storage architectures. For example, traditional storage architecture, as described above, generally includes a file system and I/O subsystem that are organized to execute entirely on a host computer. In response to an I/O transaction request issued by an application, the host processor executes the software code of the file system and I/O subsystem needed to transfer data from storage devices to the host memory. In this architecture, the host processor actually executes the code of the I/O stack twice for the I/O transaction: once as the transaction descends the stack and again as the results of the transaction are returned to the application. Execution of I/O operations for this type of architecture clearly consumes significant computer resources.

To avoid such consumption of resources, some storage architectures alter the arrangement of their file systems and I/O subsystems. For example, a conventional RAID controller architecture may be provided wherein the file system is contained within the host computer and the I/O subsystem is distributed between the host computer and controller. Most implementations of this architecture are configured to execute RAID-related operations by transferring discrete block-oriented requests between the file system and controller. When these requests complete, however, the host processor is notified by means of interrupts, i.e., events that change the normal flow of instruction execution by the host processor. For this type of architecture, there may be many interrupts associated with a single transaction. Because each interrupt must be serviced by the host processor, this architecture results in inefficient use of the processor.

Other storage architectures provide their file systems and I/O subsystems entirely on the controller. For example, a host computer may interact with the controller in accordance with a conventional client-server computing model wherein the host computer ("client") forwards each I/O transaction to the controller ("server") typically across an interconnection such as a network. All transactions are sent to the controller and none are serviced locally at the host computer. The file controller which manages the file system of mass storage devices is coupled to the storage processors. Although this architecture relieves the host processor from I/O processing, it also adversely affects file system latency, i.e., the period of time between the issuance of an I/O transaction request by an application to the file system and the completion of that request by the file system.

More recently, a data server has been interfaced to a data network via at least one metadata server. The metadata server receives data access commands from clients in the data network in accordance with a network file access protocol. The metadata server performs file locking management and mapping of the network files to logical block addresses of storage in the data server, and moves data between the client and the storage in the data server. However, architectures that use a metadata server currently require the client operating system to provide data control and/or fail to provide file access at speeds of the data server connection.

It can be seen that there is a need for a method, apparatus and program storage device that provides a distributed file serving architecture with metadata storage virtualization and data access at the data server connection speed.

SUMMARY OF THE INVENTION

To overcome the limitations in the prior art described above, and to overcome other limitations that will become apparent upon reading and understanding the present specification, the present invention discloses a method, apparatus and program storage device that provides a distributed file serving architecture with metadata storage virtualization and data access at the data server connection speed.

The present invention solves the above-described problems by virtualizing file-block data at a metadata server and providing direct access of memory at a host by a data server. The metadata server allowing the data server to be provided input/output operation details based on the metadata to transfer file-block data directly between memory at a host and the data server.

A host in accordance with the principles of the present invention includes a central processing unit for running an application thereon, memory for storing data therein and a host bus adapter, coupled to the memory, the host bus adapter including an adapter processor configured for issuing an input/output request to a metadata server and for enabling direct memory access transfer of data associated with the input/output request directly between the memory and a data server.

In another embodiment of the present invention, a metadata server is provided. The metadata server includes memory for storing metadata associated with data on a data server and a processor configured for receiving an input/output request from a host and issuing to the data server input/output operation details based on the metadata for transferring file-block data directly between memory at the host and the data server.

In another embodiment of the present invention, a data server is provided. The data server includes at least one storage device for storing file-block data thereon and a processor, operatively coupled to the storage device, the processor being configured for receiving from a metadata server input/output operation details associated with an input/output request of a host, for establishing a direct connection to a memory address at the host identified by the received input/output operation details, and for transferring file-block data referenced by the received input/output operation details directly between the memory address of the host and the at least one storage device.

In another embodiment of the present invention, a storage network is provided. The storage network includes a host including a first memory for use in processing an input/output request, the host being configured for issuing the input/output request, a metadata server, coupled to the host, the metadata server including a second memory for storing metadata associated with file-block data, the metadata server further being configured for receiving the input/output request from the host and for providing input/output operation details for processing the input/output request and a data server, operatively coupled to the host and the metadata server, the data server including at least one storage device for storing the file-block data thereon, the data server being configured for receiving from the metadata server the input/output operation details for processing the input/output request, for establishing a direct connection to a memory address at the host identified by the input/output operation details from the metadata server, and for transferring file-block data referenced by the input/output operation details directly between the identified memory location at the host and the at least one storage device.

In another embodiment of the present invention, another storage network is provided. This storage network includes a host being configured for issuing a file access request, a metadata server, coupled to the host, the metadata server being configured for receiving the file access request from the host and for providing to the host data block information associated with the file access request and a data server, operatively coupled to the host, the data server including at least one storage device for storing file-block data thereon, the data server being configured for receiving commands identifying memory locations and for transferring file-block data directly between the identified memory location at the host and the at least one storage device.

In another embodiment of the present invention, a program storage device readable by a computer is provided. The medium tangibly embodies one or more programs of instructions executable by the computer to perform a method for making data access at data server connection speed in a distributed file serving architecture with metadata storage virtualization, wherein the method includes issuing an input/output request to a metadata server and transferring data associated with the input/output request directly between the memory at a host and a data server.

In another embodiment of the present invention, another program storage device readable by a computer is provided. This medium tangibly embodies one or more programs of instructions executable by the computer to perform a method for making data access at data server connection speed in a distributed file serving architecture with metadata storage virtualization, wherein the method includes storing metadata associated with data on a data server and in response to an input/output request, issuing to the data server input/output operation details based on the metadata for transferring file-block data directly between memory at a host and the data server.

In another embodiment of the present invention, another program storage device readable by a computer is provided. This medium tangibly embodies one or more programs of instructions executable by the computer to perform a method for making data access at data server connection speed in a distributed file serving architecture with metadata storage virtualization, wherein the method includes storing file-block data on a data server comprising at least one storage device and receiving at a data server input/output operation details associated with an input/output request of a host from a metadata server, establishing a direct connection from the data server to a memory address at the host identified by the received input/output operation details and transferring file-block data referenced by the received input/output operation details directly between the memory address of the host and the data server.

In another embodiment of the present invention, another program storage device readable by a computer is provided. This medium tangibly embodies one or more programs of instructions executable by the computer to perform a method for making data access at data server connection speed in a distributed file serving architecture with metadata storage virtualization, wherein the method includes issuing from a host a file access request including data target locations, processing the file access request including data target locations, issuing a remote direct memory access channel endpoint connection in response to the processing the file access request including data target locations and transferring file-block data associated with the file access request directly between a memory at the host and a data server.

In another embodiment of the present invention, another host is provided. This host includes means for running an application thereon, memory means for storing data therein, and processing means configured for issuing an input/output request to a metadata server and for enabling direct memory access transfer of data associated with the input/output request directly between the memory and a data server.

In another embodiment of the present invention, another metadata server is provided. This metadata server includes means for storing metadata associated with data on a data server and means for receiving an input/output request from a host and issuing to the data server input/output operation details based on the metadata for transferring file-block data directly between memory at the host and the data server.

In another embodiment of the present invention, another data server is provided. This data server includes means for storing file-block data thereon and means, operatively coupled to the means for storing, for receiving from a metadata server input/output operation details associated with an input/output request of a host, for establishing a direct connection to a memory address at the host identified by the received input/output operation details, and for transferring file-block data referenced by the received input/output operation details directly between the memory address of the host and the at least one storage device.

In another embodiment of the present invention, another storage network is provided. This storage network includes hosting means including first memory means for use in processing an input/output request, the host being configured for issuing the input/output request, metadata means, coupled to the hosting means, the metadata means including a second memory means for storing metadata associated with file-block data, the metadata means further being configured for receiving the input/output request from the hosting and for providing input/output operation details for processing the input/output request and a data means, operatively coupled to the hosting and the metadata means, the data means including at least one storage means for storing the file-block data thereon, the data means being configured for receiving from the metadata server the input/output operation details for processing the input/output request, for establishing a direct connection to a memory address at the hosting means identified by the input/output operation details from the metadata means, and for transferring file-block data referenced by the input/output operation details directly between the identified memory location at the hosting means and the data means.

In another embodiment of the present invention, another storage network is provided. This storage network includes hosting means for issuing a file access request, metadata means, coupled to the hosting means, the metadata means receiving the file access request from the host and providing to the host data block information associated with the file access request and data means, operatively coupled to the hosting means, the data means including at least one storage means for storing file-block data thereon, the data means receiving commands identifying memory locations and transferring file-block data directly between the identified memory location at the hosting means and the data means.

In another embodiment of the present invention, a method for providing a distributed file serving architecture with metadata storage virtualization and data access at data server connection speed is provided. The method includes issuing from a host a file access request including data target locations, processing the file access request including data target locations, issuing a remote direct memory access channel endpoint connection in response to the processing the file access request including data target locations and transferring file-block data associated with the file access request directly between a memory at the host and a data server.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiments of the invention, reference is made to the accompanying drawings which form a part hereof, and in which is shown by way of illustration these embodiments in which the invention may be practiced. It is to be understood that other embodiments may be utilized as structural changes may be made without departing from the scope of the present invention.

The present invention provides a method, apparatus and program storage device that provides a distributed file serving architecture with metadata storage virtualization and data access at the data server connection speed. The present invention enables file-level data to be served to a client in a virtualized storage architecture at data server connection speeds where the metadata is served by an entity distinct from the entity serving actual file block data.

Figure 1:
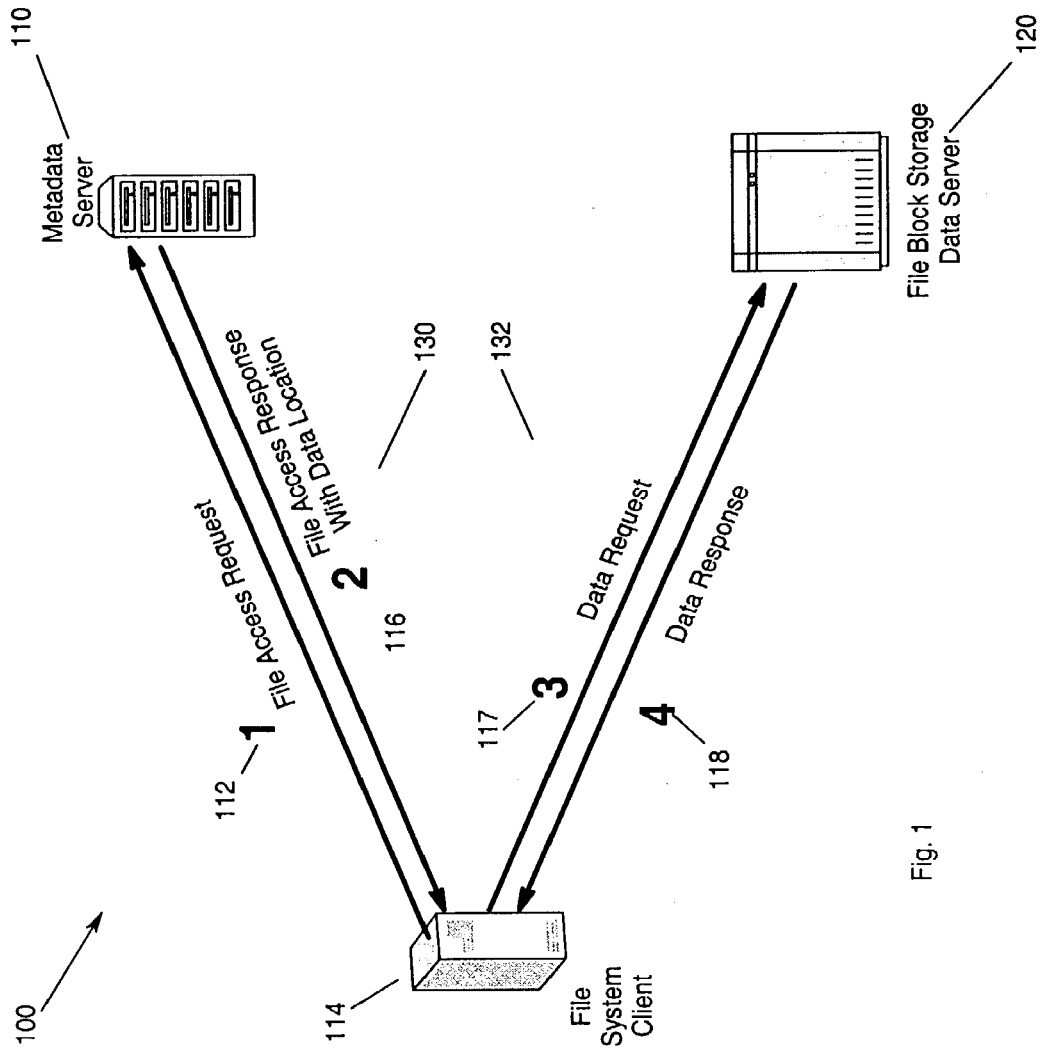
FIG. 1 illustrates one solution for providing file data service wherein metadata is served by an entity separate from the entity serving actual file block data.

FIG. 1 illustrates one architecture 100 for providing file data service wherein metadata is served by an entity separate from the entity serving actual file block data. In FIG. 1, the metadata server (MS) 110 receives data access commands 112 from clients 114 in the data network in accordance with a network file access protocol. The metadata server 110 performs file locking management and mapping of the network files to logical block addresses of storage in the data server (DS) 120. In FIG. 1, two connections 130, 132 are used to provide a four step process for fetching the data to the file system client 114. The client 114 queries the metadata server 110 to get the file attributes and its location 116 in the virtual storage managed by the data server 120. Then, in a separate data connection, possibly over a separate network, the client 114 requests the data from the data server 120. All of this activity occurs in an installable file system on the client 114, so that applications of the client do not see the difference.

The client 114 includes a file system interpreter (not shown) that translates the view of the file system of the client 114 that is served by the metadata server 110. The metadata server 110 forwards pointers in metadata server data structures to the client 114. Metadata server data structures point to the actual data blocks on the data server 120. The metadata server data structures act as a meta-file system to the client 114. The client 114 interprets the metadata server data structures using its file system interpreter to produce file system metadata referencing actual data blocks. Thus, the file system interpreter on the client 114 determines from the metadata server 110 where data blocks are on the data server 120, and makes raw block requests 117 to the data server 120. The data server 120 returns the request data 118.

The system architecture illustrated in FIG. 1 provides an installable file system on the client 114, a storage access driver installed on the client 114, and an intelligent metadata server 110, as well as commodity hard disk drive (HDD) storage enclosures at the data server 120. The system architecture illustrated in FIG. 1 also uses typical storage network infrastructure, such as switches, cables, host bus adapters (HBAs), etc.

Benefits of the system architecture illustrated in FIG. 1 include storage virtualization and management at the metadata server 110, large file access at the speed of the client connection to the data server 120 and the necessity of the data server 120 to have only a JBOD (Just a Bunch Of Disks) level of intelligence. File system semantic benefits include manageability and copy services at the metadata server 110 while no changes to the applications of the client 114 are needed.

However, the system architecture illustrated in FIG. 1 has several negative aspects. First, a radical change of the underpinnings of the file system of the client 114 is required. The system architecture illustrated in FIG. 1 also requires two full synchronous transactions to achieve data transfer. Typical implementations of the system architecture illustrated in FIG. 1 would place the metadata connection 130 over an IP LAN (Internet Protocol Local Area Network) and the data server connection 132 over a Fibre Channel SAN (Storage Area Network). Another shortcoming is that data delivery is synchronous to the requesting thread. This is typically dealt with by multi-threading so that each thread context waits on an Operating System (OS) served data request. Nevertheless, data transfer is still in the control of the operating system at the client 114 with all the performance impediments that implies, e.g., page-size access granularity, context switching and interrupt handling overhead, potential for extra copy operations, double caching concerns between the application and the OS. Furthermore, clients are limited to the standard OS file system interface or a direct storage block interface.

Figure 2:
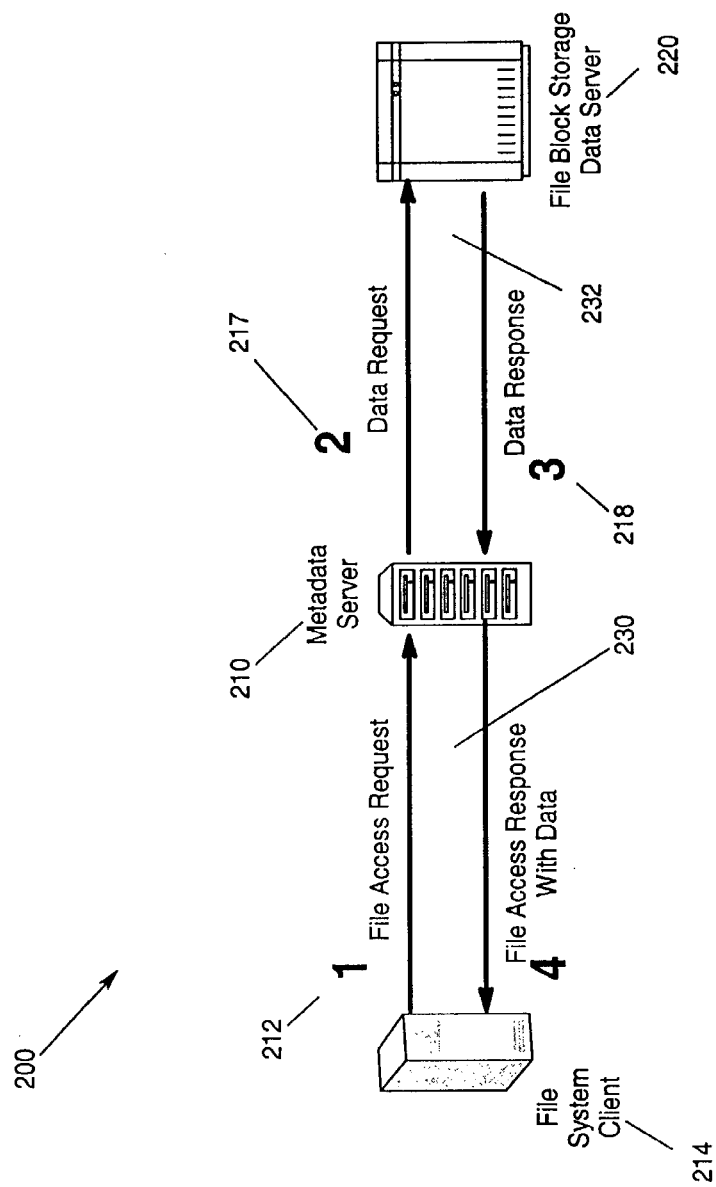
FIG. 2 illustrates a second architecture for providing file data service wherein metadata is served by an entity separate from the entity serving actual file block data.

FIG. 2 illustrates a second architecture 200 for providing file data service wherein metadata is served by an entity separate from the entity serving actual file block data. In FIG. 2, virtualization of the storage is controlled at the metadata server 210. The client 214 requests 212 data from a storage virtualization interpreter at the metadata server 210. The metadata server 210 then makes a real data request 217 to the storage 220 that it owns. Next, the data response 218 is funneled from the data server 220 back through the metadata server 210 to the client 214. The file system of the client 214 does not need to change, although its storage access driver will change to recognize the metadata server virtualization device as a storage target.

Objects of the second architecture illustrated in FIG. 2 include the storage access driver being installed on the client 214, an intelligent metadata server 210, commodity HDD storage enclosures, and typical storage network infrastructure such as switches, cables, HBAs, etc. Benefits of the second architecture illustrated in FIG. 2 include storage virtualization and management at the metadata server 210 and allowing the data server 220 to have only a JBOD level of intelligence. The applications of the client 214 are also unchanged.

Nevertheless, the second architecture illustrated in FIG. 2 also includes several negative aspects. First, the second architecture illustrated in FIG. 2 requires a single synchronous transaction (from the client perspective) to achieve data transfer. Also, typical implementations place the metadata connection 230 over an IP LAN and the data connection 232 over a Fibre Channel SAN. However, data delivery is synchronous to the requesting thread, and is typically dealt with by multi-threading so that each thread context waits on an OS served data request. Still further, data transfer remains in the control of the operating system with all the performance impediments that implies, as mentioned above. The metadata server 210 must also now be a high throughput stackable storage switch or the architecture will not be scalable. Moreover, clients 214 are limited to a standard OS file system interface or direct storage block interface.

As can be seen from the architectures illustrated in FIGS. 1-2, such systems that use a metadata server currently require the client operating system to provide data control and/or fail to provide file access at speeds of the data server connection. Thus, the present invention provides a distributed file serving architecture with metadata storage virtualization and data access at the data server connection speed. The present invention allows the SAN speed I/O transfer desired by implementations of the metadata server, while achieving unprecedented reductions in client overhead for those I/O transfers.

Figure 3:
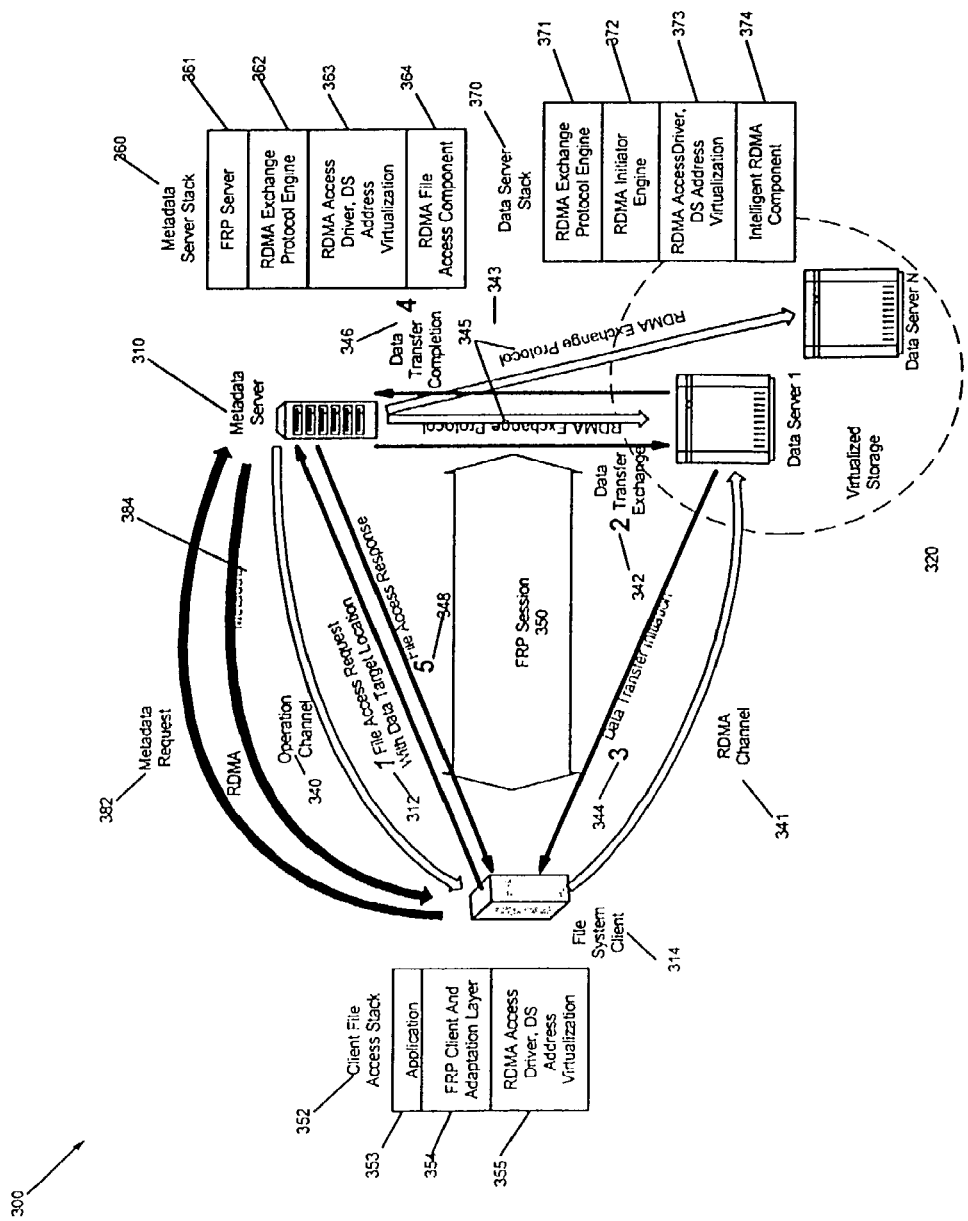
FIG. 3 illustrates a storage system architecture according to an embodiment of the present invention.

FIG. 3 illustrates a storage system architecture 300 according to an embodiment of the present invention. The storage system illustrated in FIG. 3 provides file data service using a metadata server 310 separate from the data server 320 that serves actual file block data. In FIG. 3, virtualization of the storage is controlled at the metadata server 310. The client 314 makes a file access request with data target locations 312 to the metadata server 310 via an operation channel 340. The metadata server 310 requests data from a storage virtualization interpreter at the metadata server 310. The metadata server 310 then provides RDMA I/O operation details 342 to the data server 320. Thereafter, the data server 320 initiates the I/O. Remote direct memory access 344 is used to transfer data between the data server 320 and buffers on the client 314. When the I/O completes, the data server 320 sends a completion notice 346 to the metadata server 310. The metadata server 310 then sends a file access response indicating completion of the session 348 to the client 314.

This process is complete through a File-based RDMA Protocol (FRP) session 350. The client 314 speaks the file access protocol to the metadata server 310. Direct Access File System (DAFS) is a specific example of a file access protocol. The client 314 includes a client file access stack 352 that includes an application 353, a FRP Client and Adaptation Layer 354, and RDMA Access Driver/DS Address Virtualization 355. The storage system architecture according to the present invention utilizes a DAFS client-server connection. While the present invention will be explained with reference to the DAFS, the present invention is not meant to be limited to DAFS. Rather, any file access protocol that provides similar functionality for achieving the same results may be used.

A distributed Remote Direct Memory Access (RDMA) file serving architecture is implemented at the metadata server 310 and RDMA engines 370 at the data servers 320. The metadata server 310 has a metadata server stack 360 that includes a FRP server 361, RDMA Exchange Protocol Engine 362 and RDMA Access Driver/DS Address Virtualization 363. A data server 320 includes a data server stack 370, which provides RDMA Exchange Protocol Engine 371, RDMA Initiator Engine 372 and RDMA Access Driver/DS Address Virtualization 373.

The meta-protocol enables exchange of RDMA I/O operation initiation details and completion notifications. For example, the RDMA engine 370 at a data server 320 may receive an I/O tag, connection id, client, client memory location, client protection tag, file location, file offset, byte count, etc. for each I/O from the metadata server.

The DAFS protocol is designed to take advantage of emerging RDMA interconnect technologies such as InfiniBand, Virtual Interface (VI) and iWARP. DAFS provides a fast method of accessing data from a data server 320 via the RDMA channel 341. Such RDMA interconnect technologies provide two fundamentally new capabilities that are not found on traditional interconnection networks.

The first capability is direct memory-to-memory transfer. Remote Direct Memory Access (RDMA) is the ability of one computer to directly place information in the other computers memory with minimal demands on memory bus bandwidth and CPU processing overhead, while preserving memory protection mechanisms. A Remote Procedure Call (RPC) message protocol provides two distinct structures: the call message and the reply message (i.e., RPC Call Message and RPC Reply Message). A client 314 uses these messages to make a remote procedure call to a network server and to receive a reply containing the results of the procedure's execution. By providing a unique specification for the remote procedure, RPC can match a reply message to each call (or request) message. RDMA allows bulk data to bypass the normal protocol processing and to be transferred directly between appropriately aligned buffers on the communicating machines.

The second capability is direct application access, wherein application processes can queue data transfer operations directly to RDMA compliant network interfaces without operating system involvement. DAFS, thus, allows clusters of application servers to efficiently share data while avoiding the overhead imposed by general-purpose operating systems.

Adapters that support an interconnect interface technology, such as the Virtual Interface (VI) architecture, provide direct memory access of data directly from the buffers on the adapter to the application buffers, bypassing a copy from the adapter buffers to the operating system networking buffers, and the copy from the networking buffers to the operating system file buffers. Implementations may exist over IP networks, InfiniBand networks, Fibre Channel networks, and a limited number proprietary networks. Such adapters may be implemented in the components of the storage system architecture 300 of the present invention as illustrated in FIG. 3.

Because the client 314 can avoid making the data copies for its applications associated with the traditional file access model, much less client CPU per file access is used, as well as much less client memory per file buffer. The distributed RDMA file serving architecture 300 is implemented at the metadata server 310 and RDMA engines 370 on the data servers 320 to accomplish these goals.

A DAFS client-server connection consists of a session that includes three channels. The client submits all requests on the Operations Channel 340, where only the client is allowed to asynchronously initiate communication. The second channel is the Back Control Channel 343 on which the metadata server 310 initiates all communication through an RDMA Exchange Protocol 345. The third channel is the RDMA Channel 341, wherein the data server 320 initiates all communication for raw data transfer to/from the buffers of the client 314. The RDMA channel 341 is actually only one way and is invisible to the client 314 except for channel setup. As a DAFS construct, the RDMA channel 341 is merely a wrapper for a connection between the two RDMA storage access drivers (on the client 314 and data server 320), no DAFS level requests or responses occur on this channel. RDMA is preferably initiated by the data server 320 and occurs invisibly to the client 314.

The metadata server 310 provides operational response on the Operations channel 340 according to, for example the DAFS protocol, once the RDMA transfer has been marked complete. The Operations 340 and RDMA 341 Channels are part of the same client-server session 350, but are two separate RDMA communication endpoint connections with respect to the RDMA storage access driver and adapter. The RDMA Channel 341 is one-way from the data server 320, with no protocol exchange other than setup at the transport level and session binding at the DAFS level.

The RDMA Access Driver 355 on the client 314 is under the control of the architecture implementer, and thus can use namespace generalization to allow the data servers 320 to appear as one virtual address to the FRP Client and Adaptation layer 354. Thus, the FRP implementation can compose a session from an operations channel 340 connection to the metadata server 310, and an RDMA channel 341 to the virtual address of the data server 320.

At the client 314, the RDMA Access Driver 355 enables the direct access of its buffers. The client 314 also includes an FRP Client and Adaptation layer 354 for client applications which directly access the RDMA enabled adapter and enables RDMA to/from application buffers.

The metadata server 310 speaks the FRP and provides virtualization of the data on the data server 320. There are at least two types of metadata in this system. First, there exists file system metadata, which includes the "inodes" which are stored in raw data blocks and form the directory structure, mapping file blocks to raw data blocks. Second, there exists block data virtualization metadata, which is in essence a "meta-file system". Each client will communicate with a "file system interpreter", which preferably resides at the metadata server. A file system interpreter may reside instead at the client/host, but this requires modifications to the client and is therefore not as efficient.

Implementing an File-based RDMA Protocol (FRP) necessitates adding to the metadata server 310 a RDMA File Access Component (RFAC) 364. The RFAC 364 acts as the file system interpreter. The RFAC 364 maps the FRP file system to the metafile system of the metadata server 310. The RFAC 364 is the file server, and also manages the server side connection endpoints for the FRP sessions. The RFAC 364 translates the RDMA file access language to the meta-file system language. Then, the metadata server 310 provides (for each request) the mapping to raw data blocks on the data server(s) 320. RFAC 364 communicates with the appropriate intelligent RDMA component 374 of each data server 320 to exchange the RDMA connection channel endpoint information for the session and the details of the needed data exchange 342. Then, the intelligent RDMA component 374 for that data server 320 initiates the RDMA activity 344 directly to/from the client's memory buffers. At completion, the intelligent RDMA component 374 of the data server 320 notifies the RFAC 364, which in turn replies to the client 314 that the transfer has completed. The intelligent RDMA component 374 of the data server 320 may be a special separate controller, a value-add feature to a RAID controller itself, etc. Note also that the data server 320 may include a RAID controller.

Alternatively, the intelligent RDMA component 374 may be implemented as an additional software component on the metadata server 310. While, the intelligent RDMA component 374 is illustrated as part of the data server stack 370, the intelligent RDMA component 374 may instead be part of the metadata server stack 360.

Still as a further alternative, the intelligent RDMA component 374 may be implemented as an installable component at the client/host 314. Thus, the intelligent RDMA component may instead be part of the client stack 352 even though in FIG. 3 the intelligent RDMA component 374 is illustrated as part of the data server stack 370. Even if the intelligent RDMA component 374 is implemented as an installable component at the client/host 314, RDMA would still be used to transfer data from the data server 320 to the client 314 with the intelligent RDMA component 374 controlling it. In this case, the intelligent RDMA 374 would issue commands to the raw block storage offered by the data server 320.

Figure 4:
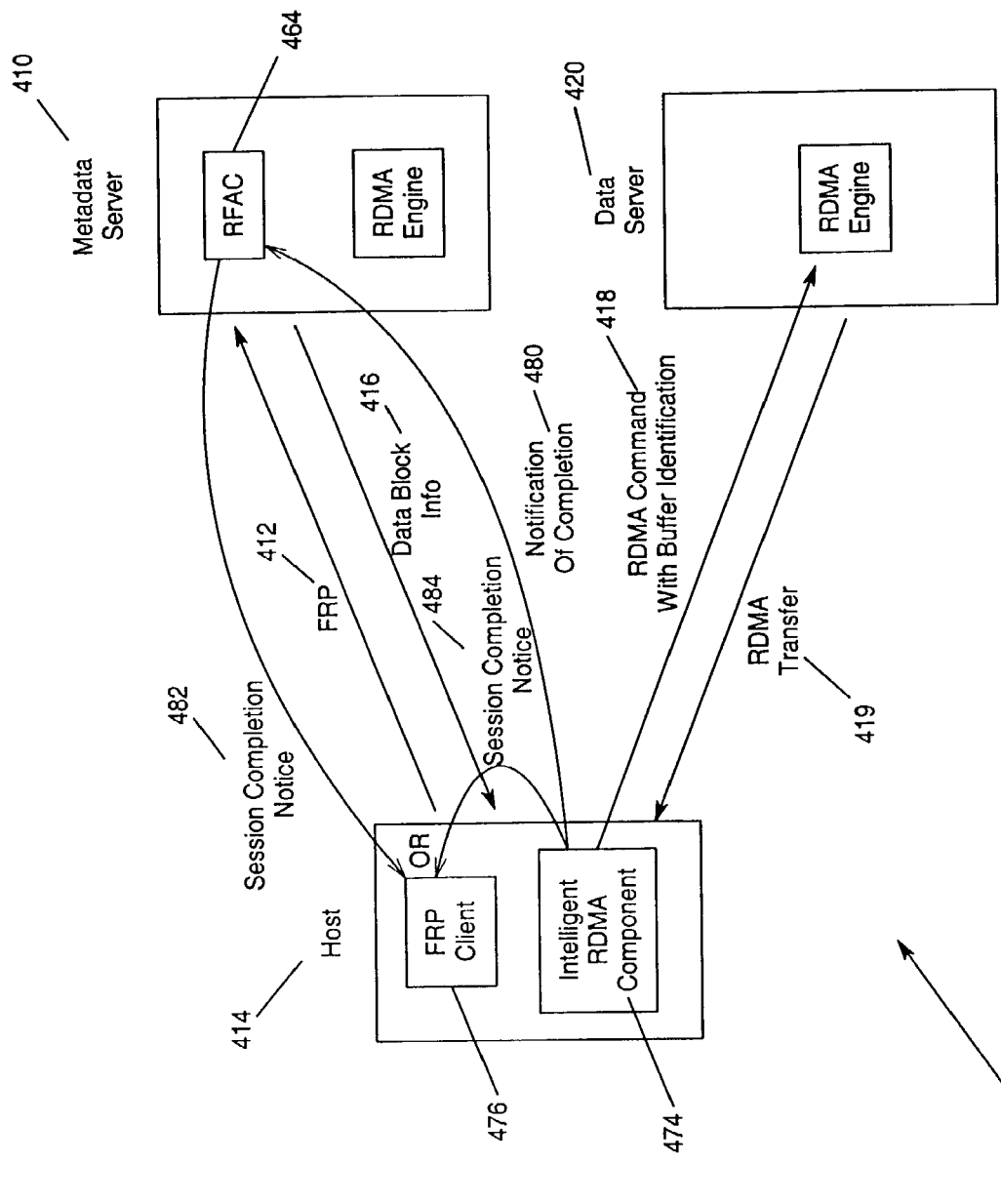
FIG. 4 illustrates the intelligent RDMA component as a part of the client stack.

FIG. 4 illustrates the intelligent RDMA component as a part of the client stack 400 according to the present invention. In operation, the client 414 issues an FRP command 412 to the metadata server 410, which houses the RDMA File Access Component (RFAC) 464 to serve as control connection endpoint server for the FRP in the architecture. The RFAC 464 communicates with the standard metadata server software components to discover which data blocks on the data server 420 will be required to service the request. The RFAC 464 then sends the data block information back to the intelligent RDMA component 474 at the client. The intelligent RDMA component 474 at the client 414 then initiates RDMA transfer 419 from the data server by issuing user-level networking commands 418 with the client target buffers as arguments. The RDMA transfer 419 is then initiated. When the RDMA transfer 419 completes, a callback is issued from the user-level networking interface. At RDMA transfer 419 completion, the intelligent RDMA component 474 must trigger completions at the metadata server 410, i.e., the RFAC 464, and at the client 414, i.e., the client's FRP client 476. The intelligent RDMA component 474 can either send a completion notice 480 to the RFAC 464 at the metadata server 410, which will then in turn send a traditional FRP completion notice 482 to the client 414, or send a completion notice 480 to the RFAC 464 on the metadata server 410 simultaneously with one 484 to the client 414.

The second procedure has a downside because the intelligent RDMA component 474 has to have some knowledge of the control connection between the metadata server 410 and the client 414 respecting flow control sequence numbers. This is a different type of connection semantic, which actually triggers a well-formed message in a different protocol from the one between the FRP client 476 and the intelligent RDMA component 474. However, it saves some delay.

Referring again to FIG. 3, the metadata server 310 invalidates the cache of the client because of metadata changes caused by writes from other clients or other reasons (e.g., file system migration, recovery operations, etc.). If the cache layer is a shim or library there is no resident thread to respond to cache invalidations initiated by the metadata server 310. This is handled by a back-control or secondary operations channel 343 (DAFS calls it the 'Back-Control Channel') which allows for server (in this case, metadata server 310) initiated operations asynchronously delivered to the client 314. It is then the responsibility of the caching library of the client 314 to check this channel 343 for notifications from the metadata server 310 which force a full or partial cache invalidation before using cached metadata.

The data server 320 includes an RDMA Engine 370 (e.g., the RDMA Exchange Protocol Engine, RDMA Initiator Engine and RDMA Access Driver/DS Address Virtualization) at or near a controller (not shown) for the data server 320, which interacts with the metadata server 310 to get connection and client target buffer information, initiates RDMA reads and writes to client buffers to achieve data transfer and sends completion notices to the metadata server 310 for RDMA operations. An RDMA engine 370 may be placed at each data server 320 and be capable of managing an RDMA storage access endpoint, an RDMA exchange protocol endpoint and the one way RDMA FRP channel endpoint. The RDMA engine could be placed on a very small server engine inside the storage enclosure, behind and controlling the RDMA enabled adapter, or externally. However, placing the RDMA engine 370 externally raises scalability and bandwidth questions.

A data server 320 may be just a set of LUNs (Logical Unit Numbers) with a RAID controller front end that satisfies Fibre Channel data requests. The data server 320 does not manage metadata. Thus, the data server 320 has no notion of file blocks, only of LUN blocks, which are of course just portions of the logical array presented by the RAID controller as a LUN. Accordingly, the data server 320 uses commodity HDD storage enclosures.

As mentioned above, the client 314 will have an FRP connection to the metadata server 310. The FRP connection must be handed off in a coherent fashion to the data server for RDMA. DAFS provides for the additional channels that are part of the same session. One of these can be established with the data server 320 set through a virtual address representing all of the data servers 320, such that the DAFS client has at least two connections for its session, one with the metadata server 310 for metadata access and I/O initiation, and one with a data server 320 set virtual address that is an inbound channel to the client 314, i.e., a connection where transfers are initiated by the data server 320.

For example, for a file read, the client 314 sits on the SAN and speaks the FRP to the metadata server 310 requesting the RDMA read. The client 314 sends its local buffer information and protection tag as indicated in the FRP 312. The metadata server 310 (after satisfying normal metadata requests, for which it is designed) relays the RDMA information 342 to a data server 320. The data server 320 RDMAs 344 the file data directly to the buffers of the client 314 and replies 346 to the metadata server 310 that the read has been satisfied. The metadata server 310 sends an FRP read response 348 to the client 314. Because FRPs are typically asynchronous I/O enablers, the slight added latency is not a problem, but the reduced client overhead is a huge benefit in terms of application performance. Thus, RDMA proceeds from the data server 320 to the client 314 to deliver file block data (for reads) and to pull file block data (server initiated RDMA Reads, in response to client FRP write requests, i.e., client RDMA writes).

Metadata delivery may be provided via standard request/ response RPC-style message exchange between the client and metadata server, as well as RDMA delivery of metadata from the metadata server to the client. RDMA may be preferred for delivery of large chunks of metadata such as listings of large directories, delivery of long Access Control List designations, or specification of extended file attributes. Thus, the client may make a metadata request 382 to the metadata server 310, specifying a reply buffer large enough to hold the requested information. The metadata server 310 could then RDMA the metadata 384 into the buffer and responds to the client 314 with a normal message delivering the status of the operation.

As can be seen, the metadata server 310 is a separate logical unit from the devices 320 serving block storage, even though the storage system architecture of the present invention may include a metadata server 310 which doubles as a data server 320 using software modules on the same server representing the metadata server 310 and data server 320. Clients 314 of this file system have an installable File System (IFS) driver which translates application data requests into file system requests for metadata and file locations from the metadata server 310, which is on the same storage area network (SAN).

Data access occurs across one FRP session 350 consisting of an Operations Channel 340 and an RDMA channel 341. This enables the five step process, as illustrated in FIG. 3, for data access, which looks to the client like one data request/ response pair. Data transfer occurs at transport speed from data server 320 to application buffers on the client 314, initiated by the RDMA engine stack 370 on the data server 320, as controlled by the metadata server FRP server stack 360 of the metadata server 310. This achieves storage virtualization at the metadata server 310 while allowing the client 314 data access at data server 320 connection speed, and avoiding the problems inherent with giving data control to the client OS.

Both third-party as well as client initiated RDMA channels 341 are supported. The client 314 may interact directly with the data servers 320 or metadata server 310 for the separate RDMA connections. The connections are separate channels, but are part of the same session. RDMA may occur between the client 314 and metadata server 310 over the main operations channel connection 340 for the session, as well as over the other channels which would be between the client and a third-party, e.g., the data server 320. The separation of the channels 340, 341, while tying them to the same overall session 350, allows RDMA to proceed between a data server 320 and a client 314 in coordination with operations. The session identifier will be passed as part of the meta-protocol between the metadata server 310 and data server 320 so that the data server 320 can RDMA in the face of connection authentication at the client 314.

Still, the client 314 may initiate RDMA. While it may be preferable to allow only data server 320 or metadata server 310 initiated RDMA, e.g., for server buffer security and server performance/management reasons, client-initiated RDMA across any of the discussed channels may occur. In fact, as suggested above, writes by a client 314 may be arranged as RDMA writes instead of RDMA Reads, i.e., such writes would be inherently client-initiated.

The effects of client-side caching on these RDMA channels must be considered. Metadata can occupy a significant place in a client's cache to increase the speed of directory lookups when traversing the directory tree, or holding access control lists to increase the speed of user rights determination for various operations. This is desirable because it lowers network and server loading. The FRP client 354 will have its own metadata cache or use a third-party caching shim layer or library to handle this activity as discussed above.

There are virtual address related issues as seen by the data server 320 when initiating RDMA to the client 314. This applies specifically to management of the data server address virtualization. As stated above, one separate channel is used for data server-to-client RDMA 341, which is part of one overall session 350 responsible for file access between the client 314 and the full metadata server 310/data server 320 set. The client 314 may have one persistent RDMA connection 341 for incoming RDMA from the full range of data servers 320, when each data server 320 will necessarily have a distinct transport layer address. However, the storage system architecture of the present invention does not rely on this virtualization.

Figure 5:
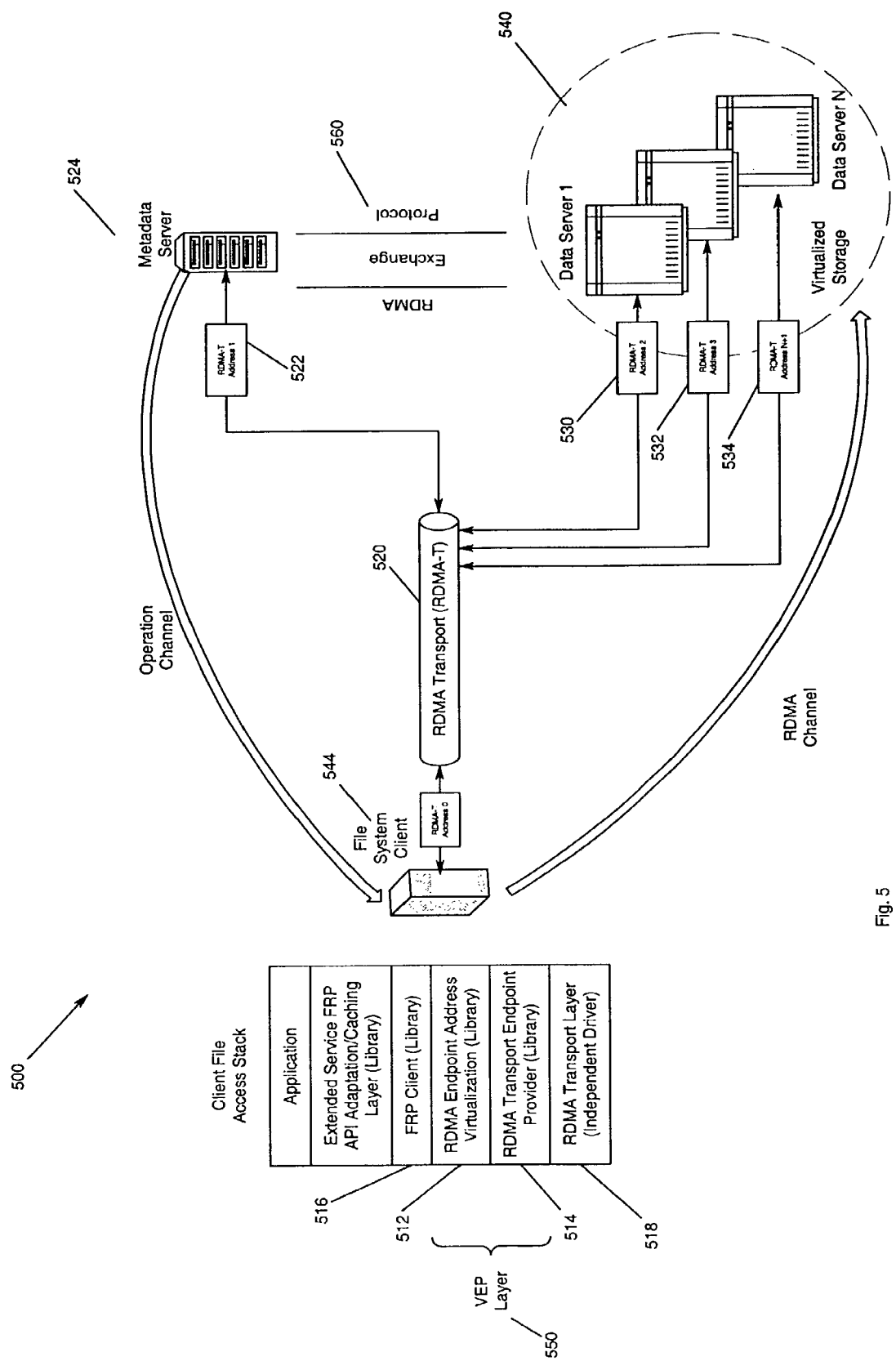
FIG. 5 illustrates additional details of the software stack of the client and the virtual addressing problem in terms of the RDMA Transport (RDMA-T) according to an embodiment of the present invention.

FIG. 5 illustrates additional details of the software stack of the client and the virtual addressing problem in terms of the RDMA Transport (RDMA-T) 500 according to an embodiment of the present invention. Referring to the Client File Access Stack 510, address virtualization is achieved by the RDMA endpoint address virtualization layer (AV layer) 512. The AV layer library 512 interacts with the RDMA transport endpoint provider layer (EP layer) 514 below it to present a single connection view to the FRP client 516. The AV layer 512 may be handed a virtual address by the FRP client 516. The virtual address is a configuration item. There are two possible methods for resolution of the virtual address. First, as a configuration detail, the AV layer 512 may consult a setup file for the virtual address translation. Second, the AV layer 512 may contact a RDMA-T name server (e.g., the metadata server 524) on the RDMA-T network 520 to resolve the virtual address. In this second method, the RDMA-T address 522 of the name server 524 would then be a configuration option.

The AV layer 512 may then open persistent RDMA connections to the set of RDMA-T addresses 530-534 referred to by the virtual address. Since RDMA operations do not result in message sends/receives at the EP layer 514, the AV layer 512 only needs be concerned whether buffers serving as RDMA targets are registered with all the connection endpoints it manages. This adds to the latency of buffer registration, but most applications will register buffers for RDMA at initialization and then lazily thereafter to avoid the already high cost of that operation being in the critical path. If a connection drops, the AV layer 512 may or may not attempt to reestablish it—this is a policy determination point. If one or two retries fail, the AV layer 512 may assume that the upper layer 516 will have dealt with the consequences. If the last or only connection drops, the AV layer 512 must deliver the disconnection notice to the FRP client 516.

Still referring to FIG. 5, a second implementation may also be illustrated. The AV layer 512 and the EP layer 514 may be merged to form a new layer that is a combination, i.e., the Virtual Endpoint layer or VEP layer 550. This assumes control over the implementation of the VEP layer 550 to allow virtual addressing and resolution. However, there are obstacles to this implementation. Briefly, such obstacles include authentication issues and achieving buffer registration against a virtual address.

First, the issues of authentication involves determining how does the VEP layer 550 know that an RDMA request from a given data server 540 is valid and not an attack. The data server 540 must know the buffer registration key for the application buffer mentioned in the original request to the metadata server 524. The data server 540 must also know the connection identifier of the metadata server 524, not only so that it can RDMA to the correct client 544, but also so that it can authenticate its access with the client 544. The connection identifier of the metadata server 524 is sent by the metadata server 524 via the RDMA Exchange Protocol 560 between the metadata server 524 and the data servers 540. The metadata server 524 gives the data server 540 its own endpoint identification key, so that when the data server 540 initiates RDMA to the client 544 it can pass the proper endpoint identifier along with the buffer location, client process id, and client buffer registration key.

Thus, even though the RDMA is not coming into the VEP layer 550 of the client 544 from the metadata server 524 RDMA-T endpoint the connection was set up with, the client 544 can authenticate the access. To the upper layers this may look as if the data server 540 is spoofing the metadata server RDMA-T address 522 by using its authentication. The authentication can be double-checked against the mapping of the configured virtual address by the client to the set of data server RDMA-T addresses 530-534, which must include the RDMA-T address of the data server 540 initiating RDMA. This mapping can again be achieved by the same two methods noted for the first implementation, e.g., as a configuration detail the VEP layer 550 consults a setup file for the virtual address translation or the VEP layer 550 may contact a RDMA-T name server (e.g., the metadata server 524) on the RDMA-T network 520 to resolve the virtual address. Again, in the second method, the RDMA-T address of the name server 524 would then be a configuration option.

As mentioned, a second obstacle is achieving buffer registration against a virtual address. The RDMA-T engine must guarantee that a buffer at the client 544 is in physical memory, i.e., it must be a target for direct memory access from the RDMA-T network interface, and part of the address space of the process that requested the RDMA operation from the metadata server 524. This is accomplished by registration with the RDMA-T driver 518, which pins or locks the buffer memory with the client OS to keep it in physical memory at a defined mapping, and to create an entry in its index mapping that buffer to a process protection tag which ties buffer, process id, and RDMA-T endpoint. The tag is returned from registration. By placing virtualization in this layer in coordination with the RDMA-T driver 518, an RDMA from a data server 540 will present the protection tag of the appropriate connection, will be a member of the virtual address-data server mapping set, and thus will be authenticated. Before buffers can be registered, the virtual address to data server address set mapping will have to be completed, such that the virtual address is a valid endpoint. Then a virtual endpoint can be created which embodies that mapping, and serves as an index point for the registration process.

Figure 6:
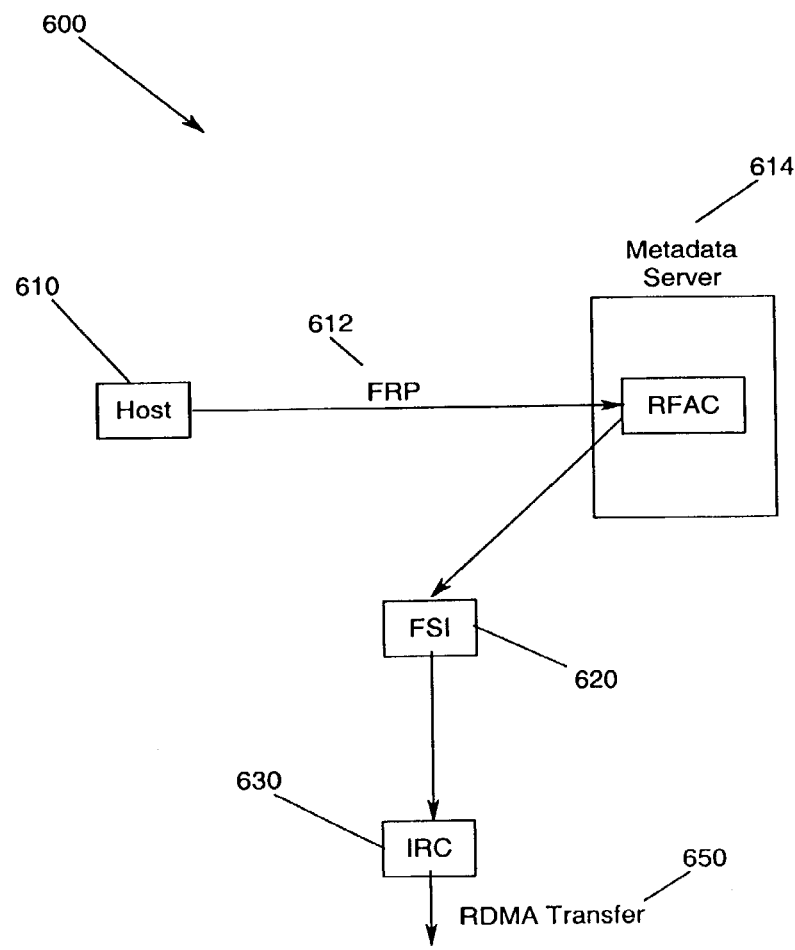
FIG. 6 illustrates the functions of the present invention without hardware limitations.

FIG. 6 illustrates the functions 600 of the present invention without hardware limitations. In FIG. 6, a host 610 makes a File-Based RDMA Request (FRP) 612 to a metadata server 614. The metadata server 614 includes a RFAC 616, which translates the RDMA file access language to the meta-file system language. A file system interpreter 620, e.g. in a host 610 or metadata server 614, provides raw block data information. RDMA channel endpoints and data details are provided to an intelligent RDMA component 630. The intelligent RDMA component 630, which may reside at the host 610, metadata server 614, or data server (not shown), controls the RDMA transfer 650 between memory at the host 610 and the data server (not shown).

Figure 7:
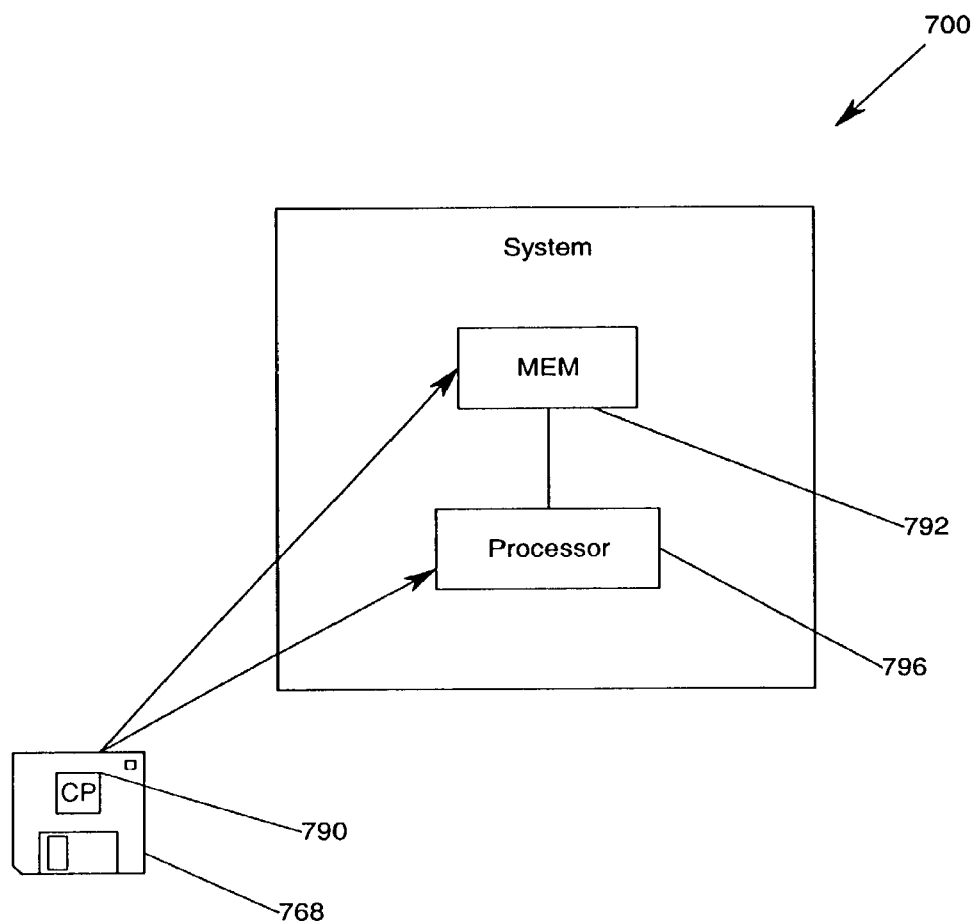
FIG. 7 illustrates a storage system component 500 according to the present invention, wherein the process illustrated with reference to FIGS. 3-6 may be tangibly embodied in a computer-readable medium or carrier.

FIG. 7 illustrates a storage system component 500 according to the present invention, wherein the process illustrated with reference to FIGS. 3-6 may be tangibly embodied in a computer-readable medium or carrier, e.g. one or more of the fixed and/or removable data storage devices 568 illustrated in FIG. 5, or other data storage or data communications devices. A computer program 590 expressing the processes embodied on the removable data storage devices 568 may be loaded into the memory 592 or into the storage system component 500, e.g., in a processor (not shown), to configure the storage system component 500 of FIG. 5, for execution. The computer program 590 comprise instructions which, when read and executed by the storage system component 500 of FIG. 5, causes the storage system component 500 to perform the steps necessary to execute the steps or elements of the present invention. Those skilled in the art will recognize that the storage system component 500 may be a client, a metadata server, a data server, a controller, etc. Furthermore, only the processes required at each component needs to be loaded to that component.

Accordingly, the present invention provides several benefits. For example, storage is virtualized and managed at the metadata server and file system semantic benefits accrue through the manageability and copy services at the metadata server. Access is also virtualized at a point of implementer control, i.e., the RDMA storage access driver. Furthermore, all file access occurs at the speed of the client RDMA channel to the data server and the data server needs only a JBOD level of intelligence—with the addition of a controller running the RDMA engine stack. Data transfer is application controlled. Full asynchrony is achievable through an event-driven and asynchronous completion notification architecture. The file system interface is no longer through blocking calls to the OS, so clients no longer need to multi-thread to effectively pipeline access requests, and can own their own asynchronous file system interface for reliability and customization. OS performance impediments are bypassed, e.g., access size granularity is limited now only by the capabilities of the transport and the transport driver, context switching and interrupt handling overheads are avoided, and extra copy operations and double caching are avoided.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data server for use with a host having a memory, and a metadata server storing metadata associated with data on the data server the data server, metadata server, and host each being separately connected to a network, the data server, comprising:
   a back control channel over the network for communication with the meta data server;
   at least one storage device for storing file-block data thereon; and
   a processor, operatively coupled to the storage device, the processor being configured for controlling, in response to input/output operation details received from the meta data server, input/output operations between the host and the at least one storage device, said controlling including:
   receiving, over the network, from the metadata server through the back control channel, input/output operation details associated with an input/output request of the host, the input/output operation details referencing file-block data,
   using the received input/output operation details to identify a memory address at the host to establish a direct connection to the memory address at the host identified by the input/output operation details received from the metadata server,
   transferring, over the network, of the file-block data referenced by the received input/output operation details directly between the identified memory address of the host and the at least one storage device, the transferring being initiated by the processor based on the received input/output operation details, and
   sending a completion notice, over the network, to the metadata server after transferring the file-block data, to initiate the metadata server sending a file access response to the host to indicate completion of the session, without the data server notifying the host of completion of the transfer of the file-block data.

2. The data server of claim 1, wherein the processor is further configured to provide the completion notice to the metadata server to signal completion of the file-data transfer between the memory address of the host and the storage device.

3. The data server of claim 1, wherein the processor further comprises a storage controller for presenting the at least one storage device as logical unit numbers and for satisfying the input/output request by processing file-block data between the memory address of the host and the at least one storage device.

4. The data server of claim 1, wherein the data server further comprises an intelligent RDMA component for controlling the RDMA transfer of file-block data between a memory address of the host and the at least one storage device.

5. The data server of claim 1, wherein the processor transfers the file-block data referenced by the received input/output operation details directly between the memory address of the host and the at least one storage device with minimum processing overhead by the operating system at the host.

6. The data server of claim 5, wherein the file-block data is transferred between the memory address at the host and the at least one storage device via an RDMA channel.

7. The data server of claim 6, wherein the RDMA channel is initiated by the host.

8. The data server of claim 6, wherein the RDMA channel is initiated by the data server.

9. A storage network, comprising: a connection network; a host including a first memory for use in processing an input/output request, the host being configured for issuing the input/output request; a metadata server, coupled to the host, the metadata server including a second memory for storing metadata associated with file-block data, the metadata server further being configured for receiving the input/output request from the host and for providing input/output operation details for processing the input/output request; and a data server, operatively coupled to the host, the data server, metadata server and host each being separately connected to the connection network, the data server having a back control channel over the connection network for communication with the metadata server, the data server including at least one storage device for storing the file-block data thereon, the data server being configured for controlling, in response to input/output operation details received from the meta data server, input/output operations between the host and the at least one storage device, said controlling including receiving, over the connection network, from the metadata server through the back control channel, the input/output operation details for processing the input/output request, the input/output operation details referencing file-block data, using the received input/output operation details to identify a memory address at the host to establish a direct connection to the memory address at the host identified by the input/output operation details received from the metadata server, transferring, over the connection network, of the file-block data referenced by the input/output operation details directly between the identified memory location at the host and the at least one storage device, the transferring being initiated by the processor based on the received input/output operation details, and sending a completion notice, over the network, to the metadata server after transferring the file-block data, to enable the metadata server to send a file access response to the host to indicate completion of the session, without the data server notifying the host of completion of the transfer of the file-block data.

10. The storage network of claim 9, further comprising an operations channel over the connections network, and an RDMA channel over the connections network, and wherein input/output request passes between the host and the metadata server via the operations channel and the file-block data is transferred directly between the memory address of the host and the at least one storage device via the RDMA channel.

11. The storage network of claim 10, wherein the operations channel and the RDMA channel form an File-based RDMA Protocol (FRP) session.

12. The storage network of claim 9, wherein the data server is further configured to issue the completion notice to the metadata server upon completion of the transferring of the file-block data directly between the memory address of the host and the at least one storage device.

13. The storage network of claim 9, wherein the metadata server further comprises an intelligent RDMA component for controlling the RDMA transfer of file-block data between the memory location at the host and the data server.

14. The storage network of claim 9, wherein the data server further comprises an intelligent RDMA component for controlling the RDMA transfer of file-block data between the memory location at the host and the data server.

15. The storage network of claim 9, further comprising an operations channel, and wherein input/output request passes between the host and the metadata server via the operations channel and the file-block data is transferred directly between the memory address of the host and the at least one storage device via an RDMA channel;
  wherein the operations channel and the RDMA channel form an File-based RDMA Protocol (FRP) session, the data server is further configured to issue a completion notice to the metadata server upon completion of the transferring of the file-block data directly between the memory address of the host and the at least one storage device and to issue a file access response to the host indicating completion of a session associated with the input/output request; and
  wherein the metadata server further comprises an intelligent RDMA component for controlling the RDMA transfer of file-block data between the memory location at the host and the data server.

16. A storage network, comprising: a connection network, a host being configured for issuing a file access request; a metadata server, coupled to the host, the metadata server being configured for receiving the file access request from the host and for providing to the host data block information associated with the file access request; and a data server, the data server, metadata server and host each being separately connected to the connection network, the data server having a back control channel over the connection network operatively coupled to the host, and having a back control channel over the connection network for communication with the metadata server the data server including at least one storage device for storing file-block data thereon, the data server being configured for controlling, in response to input/output operation details received from the meta data server, input/output operations between the host and the at least one storage device, said controlling including receiving, over the connection network, commands from the metadata server through the back control channel, the commands providing input/output operation details referencing file-block data, using a command received from the metadata server to identify host memory locations to transfer file-block data directly between the identified memory location at the host and the at least one storage device, transferring, over the connection network, of the file-block data referenced by the input/output operation details of the command directly between the identified memory location at the host and the at least one storage device, the transferring being initiated by the processor based on the received input/output operation details of the command, and sending a completion notice, over the network, to the metadata server after transferring the file-block data, to enable the metadata server to send a file access response to the host to indicate completion of the session, without the data server notifying the host of completion of the transfer of the file-block data.

17. The storage network of claim 16, further comprising an operations channel over the connections network, and an RDMA channel over the connections network, wherein input/output request passes between the host and the metadata server via the operations channel and the file-block data is transferred directly between the memory address of the host and the at least one storage device via the RDMA channel.

18. The storage network of claim 17, wherein the operations channel and the RDMA channel form an File-based RDMA Protocol (FRP) session.

19. The storage network of claim 16, wherein the host further comprises an intelligent RDMA component for controlling the RDMA transfer of file-block data between a memory address of the host and the at least one storage device.

20. A host for use with a network, a metadata server and a data server, the data server, metadata server and host each being separately connected to the network, the data server having a back control channel over the connection network for communication with the metadata server, comprising: a processor configured for running an application thereon;
  and a memory configured for storing data therein; said processor being further configured for issuing an input/output request to the metadata server to enable the metadata server to control the data server to satisfy the request, said satisfying including issuing by the metadata server to the data server through the back control channel over the network, input/output operation details based on metadata stored by the metadata server for transferring over the network file-block data directly between the memory at the host and the data server, the input/output operation details referencing file-block data, using by the data server, the input/output operation details from the metadata server to identify a memory address at the host to establish a direct connection to the memory address at the host identified by the input/output operation details received from the metadata server, transferring over the network file-block data referenced by the received input/output operation details directly between the identified memory address of the host and the data server, the transferring being initiated by the data server based on the received input/output operation details, and sending a completion notice, over the network, to the metadata server after transferring the file-block data, to enable the metadata server to send a file access response to the host to indicate completion of the session, without the data server notifying the host of completion of the transfer of the file-block data.

21. A metadata server for use with a network, a data server and a host having a memory, the data server, metadata server and host each being separately connected to the network, the metadata server comprising: a memory configured for storing metadata associated with data on the data server; a back control channel over the network for communication with the data server; and a processor configured for receiving an input/output request from the host and for controlling the data server to satisfy the request, said satisfying including issuing to the data server through the back control channel over the network, input/output operation details based on the metadata for transferring over the network file-block data directly between the memory at the host and the data server, the input/output operation details referencing file-block data, using by the data server, the issued input/output operation details to identify a memory address at the host to establish a direct connection to the memory address at the host identified by the input/output operation details received from the metadata server, and transferring over the network file-block data referenced by the received input/output operation details directly between the identified memory address of the host and the data server, the transferring being initiated by the data server based on the received input/output operation details, and sending a completion notice, over the network, to the metadata server after transferring the file-block data, said processor being further configured to send in response to the file completion notice from the data server, a file access response to the host to indicate completion of the session, without the data server notifying the host of completion of the transfer of the file-block data.

* * * * *